United States Patent [19]

Dean

[11] Patent Number: 5,115,046
[45] Date of Patent: May 19, 1992

[54] MISCIBLE POLYARYLATE-POLYAMIDE BLENDS

[75] Inventor: Barry D. Dean, Belle Mead, N.J.

[73] Assignee: Amoco Corporation, Chicago, Ill.

[21] Appl. No.: 695,937

[22] Filed: May 6, 1991

Related U.S. Application Data

[63] Continuation of Ser. No. 273,950, Nov. 21, 1988, abandoned.

[51] Int. Cl.$^5$ .................... C08L 67/02; C08L 77/10
[52] U.S. Cl. ...................... 525/425; 525/420
[58] Field of Search .................. 525/425, 420

[56] References Cited

U.S. PATENT DOCUMENTS 4,777,223 10/1988 Robeson ................. 525/425
4,895,928 1/1990 Fenoglio ................. 528/347

FOREIGN PATENT DOCUMENTS 0256761 2/1988 European Pat. Off. .......... 525/425

Primary Examiner—John C. Bleutge
Assistant Examiner—Vasu S. Jagannathan
Attorney, Agent, or Firm—Frank J. Sroka; William H. Magidson; Matthew R. Hooper

[57] ABSTRACT

Miscible, thermoplastic polyarylate-polyamide blends which are fully compatible one-phase polymer solutions. They exhibit a single glass transition temperature intermediate between the glass transition temperature of the two homopolymers. The blended materials exhibit excellent mechanical properties including solvent resistance, stress-crack resistance, melt fabricability, UV and weatherance and good strength at a weld line. Miscibility is accomplished by blending a polyarylate containing about 12 to 50 mole % tertiary butyl substituted aromatic nuclei, with an aliphatic-aromatic polyamide having a ratio of aliphatic to aromatic carbons of about 1.4 to about 2.5.

7 Claims, No Drawings

MISCIBLE POLYARYLATE-POLYAMIDE BLENDS

This application is a continuation of U.S. Ser. No. 273,950 filed Nov. 21, 1988 abandoned.

FIELD OF THE INVENTION

This invention relates to miscible polymer blends which comprise a polyamide and a polyarylate containing at least one dihydric aromatic moiety and at least one aromatic dicarboxylic acid moiety or a hydroxy arylene carboxylic acid moiety; and at least one of said moiety contains a tertiary butyl substituent.

The compositions of the instant invention are fully compatible one-phase polymer solutions. They exhibit a single glass transition temperature, intermediate between the glass transition temperatures of the polyarylate and said polyamide The materials display excellent mechanical properties, good UV resistance, good solvent and stress-crack resistance and very good melt-fabricability.

The instant discovery allows for the preparation of a host of new materials with mechanical and thermal properties tailored for specific end-use applications, such as automotive parts, appliances, electrical-electronic and the like.

BACKGROUND OF THE INVENTION

Polyarylates are aromatic polyesters derived from dihydric phenols and aromatic dicarboxylic acids. The material based on 2,2-bis(4-hydroxyphenyl)propane (bisphenol-A) and a 50:50 mixture of terephthalic and isophthalic acid moieties (1) is offered commercially by Amoco Performance Products, Inc. under the tradename of ARDEL D-100.

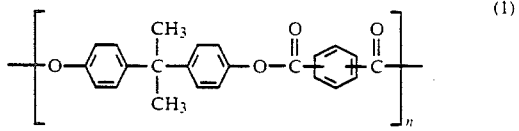
(1)

Polyarylates are high temperature, high performance thermoplastic polymers with a good combination of thermal and mechanical properties. They display excellent UV resistance and have good processability which allows them to be molded into a variety of articles.

A drawback of polyarylates is their lack of good solvent, chemical and environmental stress-crack resistance.

Polyamides comprising aliphatic diamine moieties and aromatic dicarboxylic acid moities can be either crystalline or amorphous depending on the particular moieties and concentration thereof. The crystalline versions display high melting points and provide a class of polymers with good high temperature properties. The amorphous materials have high glass transition temperatures. Both have good mechanical properties, solvent, chemical and stress-crack resistance. However, the weatherability and UV resistance and thermal performance or heat resistance of polyamides can be improved. Polyamides have been described—see, for example, J. Zimmerman, Encyclopedia of Polymer Science and Engineering, 2nd Edition, Vol. II, pp. 315-381, John Wiley and Sons, Inc., New York, N.Y., 1988. The present invention provides fully compatible and miscible one-phase polymer solutions with improved solvent, chemical, and environmental stress-crack resistance having good strength at a weld line and better weatherability and thermal performance. If the blend is not miscible, it tends to be opaque.

The advantage of having a miscible blend, over a nonmiscible blend, is that the properties of the blend are not controlled by the largest component thereof. Contrary to the present invention, in nonmiscible blends, a 1:1 ratio usually does not provide superior properties In nonmiscible blends high amounts of one or the other component are more advantageous.

The present polyarylate/polyamide miscible blends are not disclosed in the prior art.

Commonly assigned Ser. No. 208,398, which is a continuation of Ser. No. 904,907, is directed to melt processable polyamide and polyarylate polymers and copolymers made from a diamine or a diol and a diacyl compound containing 20 to 80 mole % of 5-t-butylisophthaloyl moiety. The examples are directed toward the tertiary butyl reaction with the polyamide moiety; however, there is broad mention of its attachment on the polyarylate moiety, and also possible blends with an aliphatic polyamide such as nylon 6 or nylon 66. There is no recognition of the development of a miscible blend, or the critical ratios of aromatic to aliphatic carbon atoms in the polyamide necessary to produce a miscible blend. This critical ratio is discussed fully below.

European Patent Application No. 235,384, published Sep. 9, 1987, is directed to blends of thermoplastic resins having one resin selected from a group of polycarbonate, poly(ester-carbonate) and polyarylate; in conjunction with an amorphous polyamide resin. The application shows several examples of blends containing polycarbonates and poly(ester-carbonates). Polyarylate-polyamide blends are not disclosed. This patent is directed to mechanically compatible blends but not miscible blends U.S. Pat. No. 4,749,754 is directed to tertiary blends incorporating an aromatic polycarbonate resin, an amorphous polyamide resin and an impact modifying portion of a polyamide polyether block copolymer.

U.S. Pat. No. 4,052,481 is directed to tertiary blends incorporating a polyarylate, an aliphatic polyamide and a polyalkylene phenylene ester or a polyalkylene phenylene ester ether. The materials reportedly display good chemical resistance, thermal stability and mechanical properties. Flame retardant versions contain, in addition to the above components, aromatic halogen compounds and are described in U.S. Pat. No. 4,171,330. These blends are not miscible one-phase, however. In fact, miscibility is not disclosed in any of the references listed.

U.S. Pat. No. 4,258,154 is directed to a resin composition of an aromatic polyester-polycarboxylic anhydride and a polyamide. The reference implies that a reaction of the terminal amino group of the polyamide with the anhydride group of the polyester takes place upon blending; a chemical bond between the two polymers is created. Due to the presence of the block polymer a blend with improved mechanical properties is purportedly obtained. The observed improvement suggests that one is dealing with a two-phase immiscible system.

Polymer miscibility (particularly with complex structures such as in the polymers of this invention) is virtually impossible to predict. A very small variation in structure may lead to totally different miscibility behavior. Hence, the miscibility properties of the instant composition are unexpected and unique. A brief discussion of polymer miscibility, which will illustrate the above, follows.

In the field of miscibility or compatibility of polymer blends, the art has found predictability to be unattainable, even though considerable work on the matter has been done. In fact, "[i]t is well known that, regarding the mixing of thermoplastic polymers, incompatibility is the rule and miscibility and even partial miscibility is the exception. Since most thermoplastic polymers are immiscible with other thermoplastic polymers, the discovery of a homogeneous mixture of partially miscible mixture of two or more thermoplastic polymers is, indeed, inherently unpredictable with any degree of certainty." P. J. Flory, *Principles of Polymer Chemistry*, Cornell University Press, 1953, Chapter 13, p. 555. Younes, U.S. Pat. No. 4,371,672, Wang and Cooper, *Journal of Polymer Science*, Polymer Physics Edition, Vol. 21, p. 11 (1983).

"The vast majority of polymer pairs form two-phase blends after mixing as can be surmised from the small entropy of mixing for very large molecules. These blends are generally characterized by opacity, distinct thermal transitions, and poor mechanical properties. However, special precautions in the preparation of two-phase blends can yield composites with superior mechanical properties. These materials play a major role in the polymer industry, in several instances commanding a larger market than either of the pure components." Olabisi, Robeson, and Shaw, Polymer-Polymer Miscibility, 1979, published by Academic Press, New York, N.Y., p. 7.

A number of systems have been found that exhibit upper and lower critical solution temperatures, i.e., complete miscibility only in limited temperature ranges. Modern thermodynamic theories have had limited success to date in predicting miscibility behavior in detail. Kambour, Bendler, Bopp, *Macromolecules*, 1983, 16, 753.

Thus, it is seen that miscible polymer blends are not common. The criteria for determining whether or not two polymers are miscible are now well established. According to Olabisi et al., *Polymer-Polymer Miscibility*, 1979, published by Academic Press, New York, N.Y., p. 120:

"The most commonly used method for establishing miscibility in polymer-polymer blends or partial phase mixing in such blends is through determination of the glass transition (or transitions) in the blend versus those of the unblended constituents. A miscible polymer blend will exhibit a single glass transition between the Tg's of the components with a sharpness of the transition similar to that of the components. In cases of borderline miscibility, broadening of the transition will occur. With cases of limited miscibility, two separate transitions between those of the constituents may result, depicting a component 1-rich phase and a component 2-rich phase. In cases where strong specific interactions occur, the Tg may go through a maximum as a function of concentration. The basic limitation of the utility of glass transition determination in ascertaining polymer-polymer miscibility exists with blends composed of components which have equal or similar (20° C. difference) Tg's, whereby resolution by the techniques to be discussed of two Tg's is not possible."

For purposes of this invention, a miscible blend composition has a unitary glass transition temperature. The advantage of these miscible polymer blends over a polyarylate or a polyamide polymer or over nonmiscible blends is, again, that they can be tailored to the specific mechanical properties desired without being limited to certain ratios of blend components. For example, the blends of the present invention show superior solvent, chemical, and environmental stress-crack resistance over the polyarylate polymer and superior weatherability, UV resistance and thermal performance over the polyamide polymer.

DESCRIPTION OF THE INVENTION

It was unexpectedly discovered that miscible one-phase blends are obtained by blending a polyarylate which contains tertiary butyl substituted aromatic nuclei with an aliphatic-aromatic polyamide having specific structural features as hereinbelow defined. The blends of the instant invention are one-phase systems as displayed by a single glass transition temperature. The novel materials show excellent mechanical and thermal properties; good chemical, solvent, and stress-crack resistance; and easy melt-fabricability.

A thermoplastic miscible polymer blend composition comprising:

a polyamide and a polyarylate comprising at least one member selected from the group consisting of (1) a dihydric aromatic moiety and an aromatic dicarboxylic acid moiety and (2) a hydroxy arylene carboxylic acid moiety; at least one of said moieties comprising a tertiary butyl substituent.

Not all polyamides and polyarylates can be employed in this invention. It is essential that the polyarylate contain tertiary butyl functionality and that the polyamide contain aliphatic and aromatic moieties.

The polyarylates useful in the instant invention are formed from the following dihydric phenol mixture:

(a) at least 50 and up to 100 mole % of 2,2-bis(4-hydroxyphenyl)propane (bisphenol-A);

(b) from zero to 50 mole % of 4,4'-dihydroxydiphenyl sulfone (bisphenol-S); and (c) from zero to 50 mole % of tertiary-butyl hydroquinone (2); and

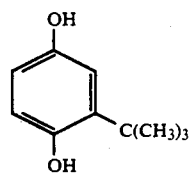  (2)

dicarboxylate moieties which are derived from nonvicinal benzene dicarboxylic acids, (e.g., isophthalic and terephthalic acids); and from 0 to 50 mole % (based on total diacids) of 5-tertiary-butyl isophthalic acid (3);

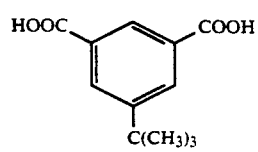  (3)

or 3-hydroxy-5-t-butyl benzoic acid with the proviso that in order to be miscible the combined mole % of the t-butyl group bearing aromatic nuclei must be within the range of 12 to 50 mole % of the total polyarylate moieties.

The polyarylates of the present invention can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S Pat. Nos 3,317,464; 3,948,856; 3,780,148; 3,824,213; 3,133,898; and 4,321,355.

The polyarylates are preferably prepared by the process as set forth in U.S. Pat. No. 4,321,355. This process comprises the following steps:

(a) reacting an acid anhydride derived from an acid containing from 2 to 8 carbon atoms with at least one dihydric phenol to form the corresponding diester; and (b) reacting the diester with at least one aromatic dicarboxylic acid at a temperature sufficient to form the polyarylate and remove residual acid anhydride after formation of the dihydric phenol diester so that its concentration is less than about 1500 parts per million.

A suitable acid anhydride is derived from an acid containing from 2 to 8 carbon atoms. The preferred acid anhydride is acetic anhydride.

Generally, the dihydric phenol reacts with the acid anhydride under conventional esterification conditions to form the dihydric phenol diester. The reaction may take place in the presence or absence of a solvent. Additionally, the reaction may be conducted in the presence of a conventional esterification catalyst or in the absence thereof.

The polyarylates have a reduced viscosity of from about 0.4 to about 1.4 dl/g as measured in chloroform at 25° C. (0.5 g/100 ml).

The dihydric phenols that may be used in this invention include the following:
2,2-bis-(4-hydroxyphenyl)propane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)-1,2-bis-(phenyl)-propane,
4,4'-(dihydroxyphenyl)ether,
4,4'-(dihydroxyphenyl)sulfide,
4,4'-(dihydroxyphenyl)sulfone,
4,4'-(dihydroxyphenyl)sulfoxide,
4,4'-(dihydroxybenzophenone),
hydroquinone, and naphthalene diols.

The aliphatic aromatic polyamides useful for the purposes of the instant invention have the general repeating formula (4):

$$-CO-R_1-CO-NH-R_2-NH-  \quad (4)$$

where each $R_1$ and $R_2$ is independently $C_1$ to $C_{20}$ straight chain or branched alkylene and $C_4$ to $C_{12}$ cycloalkylene with optional $C_6$ to $C_{20}$ aryl substitution; $C_6$ to $C_{20}$ arylene, which may be substituted with $C_1$ to $C_{12}$ alkyl or $C_1$ to $C_{12}$ alkoxy groups; aryl alkylene of 7 to 25 carbon atoms where the aryl radicals may bear $C_1$ to $C_{12}$ alkyl or $C_1$ to $C_{12}$ alkoxy substituents; with the proviso that in order to achieve a miscible blend, the following ratio of the aliphatic groups $R_1$ and $R_2$ to aromatic groups $R_1$ and $R_2$ must be in the range of 1.4 to 2.5:

$$1.4 \leq \frac{\text{Total aliphatic carbon atoms}}{\text{Total number of aromatic carbons}} \leq 2.5$$

For purposes of this ratio, aliphatic includes cycloaliphatic carbon moieties.

Typical aliphatic-aromatic polyamides are those where $R_1$ or $R_2$ are one or more of the following:

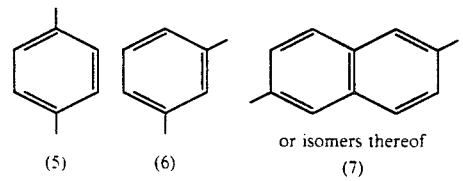

or isomers thereof (5)　　(6)　　(7)

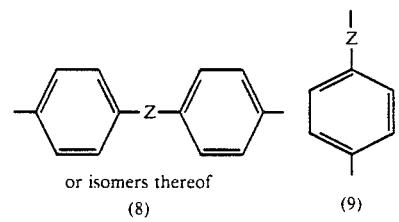

or isomers thereof (8)　　(9)

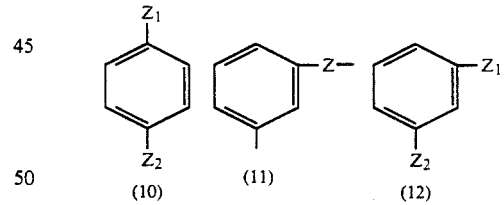

(10)　　(11)　　(12)

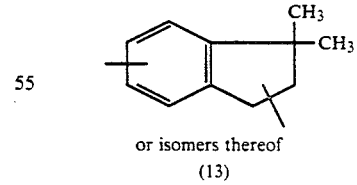

or isomers thereof (13)

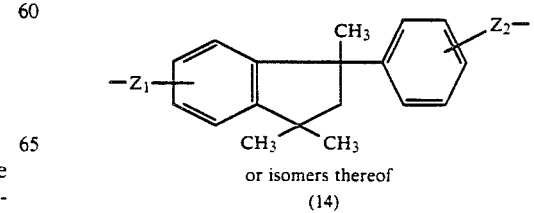

or isomers thereof (14)

-continued

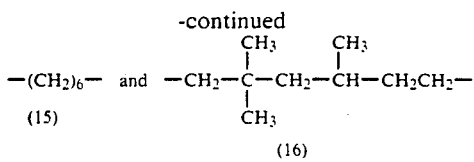

where Z, $Z_1$ and $Z_2$ are independently $C_1$ to $C_9$ alkylene, $C_2$ to $C_9$ alkylidene, or a chemical bond.

Other useful polyamides are based on diamines such as (a) the isomeric diamines of formula (17):

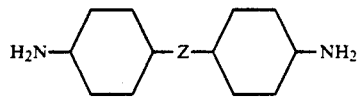

or (b) isomeric diamines of formula (18):

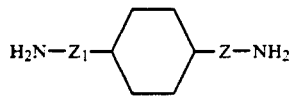

or (c) diamines having a nitrogen atom as part of a ring, i.e.:

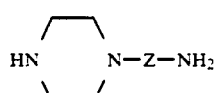

or

where Z and $Z_1$ are as previously defined.

Polyamides based on terephthalic, isophthalic and adipic acids; and hexamethylene, 2,2,4-trimethylhexamethylene and xylene diamines are preferred.

The polyamides can be prepared using solid-state, melt or solution techniques. The materials and the preparative methods are described in J. Zimmerman, Encyclopedia of Polymer Science and Engineering, 2nd Edition, Volume II, pp. 315-381, John Wiley and Sons, Inc., New York, N.Y., 1988.

The polyamides have a reduced viscosity of from about 0.8 to about 2.5 dl/g as measured in phenol/1,1,2,2,-tetrachloroethane (60/40 by wt.) or in another appropriate solvent, at 25° C. at a concentration of 0.5 g per 100 ml.

The miscible blends of the instant invention can contain from 1 to 99 percent by weight of the polyarylate and from 99 to 1 percent by weight of the polyamide. The blends can be prepared using known solution or bulk techniques. Thus, the two polymers can be dissolved in a common solvent and the blend isolated via coagulation in a non-solvent or via devolatilization. A more common and practical route utilizes melt-alloying using well known equipment such as extruders, for example, the Weiner-Pfleiderer twin-screw extruder, kneaders, mills, e.g., the Banbury mill, and the like.

The blends of the instant invention may include mineral fillers such as carbonate including chalk, calcite and dolomite; silicates including mica, talc, wollastonite; silicon dioxide, glass spheres, glass powders, aluminum, clay, quartz, and the like. Also, reinforcing fibers such as fiberglass, carbon fibers, and the like may be used. The blends may also include additives such as titanium dioxide, thermal stabilizers, and the like.

The materials of this invention can be fabricated into articles of any desired shape, e.g., moldings, coatings, films or fibers. They are also useful in blends with a variety of other polymers.

EXAMPLES

The following examples serve to give specific illustrations of the practice of this invention but they are not intended in any way to limit the scope of this invention.

PREPARATION A

The following is a general description of the process whereby a series of polyarylates useful for the purposes of the instant invention were prepared. The materials were made via the sequence of equation (I).

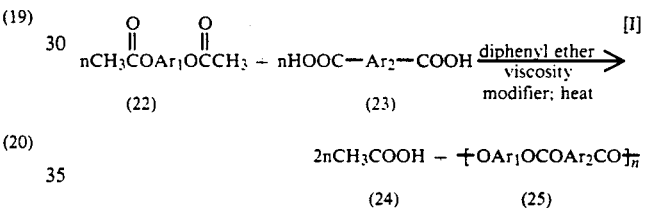

where $Ar_1$ and $Ar_2$ are the residues of a dihydric phenol and a dicarboxylic acid.

A 250 milliliter three-neck round bottom flask was equipped with a 24/40 claisen head adapter, a stainless steel paddle mechanical stirrer with sealed containment support and a distilling column/condenser unit with a 500 milliliter receiving flask. A stainless steel thermocouple was used to monitor and control reaction mass temperature.

The reaction flask was charged on a volume basis to 50 to 70% of capacity. The diacetate derivative of the dihydric phenol was charged at a 0.5 mole % excess to the diacids. Diphenyl ether was employed as a viscosity modifying agent so as to achieve a 55 to 60 weight % polymer solids. The reactor contents were purged with nitrogen at 200 cc/minute. The reaction mass was heated to between 267° to 274° C. for 12 to 14 hours. At the end of the reaction diphenyl ether was added to achieve a 20 to 25% solids solution. The reaction mass was diluted to give a 5% by weight (polymer/DPE) chloroform solution. The polymer was recovered as a fluff from coagulation into isopropanol. Prior to analysis the polymer was thoroughly dried.

The reduced viscosity of the polyarylates was measured in chloroform (0.5 g/100 ml) at 25° C.

The glass transition temperature was measured by differential scanning calorimetry (10° C./min heating rate).

The polyarylates prepared are listed in Table I.

TABLE I

| Polymer Designation | Polyarylates | | | | |
|---|---|---|---|---|---|
| | A | B | C | D | E |
| TA | 50 | 47.5 | 44.0 | 42.5 | 37.5 |
| IA | 50 | 47.5 | 44.0 | 42.5 | 37.5 |
| TBIA | — | 5.5 | 12.0 | 15.0 | 25.0 |
| Bisphenol-A | 100.0 | 100.0 | 100.0 | 100.0 | 100.0 |
| Bisphenol-S | — | — | — | — | — |
| TBHQ | — | — | — | — | — |
| RV (dl/g) | 0.62 | 0.97 | 0.99 | 0.87 | 0.83 |
| Tg° C. | 190 | 191 | 192 | 194 | 198 |
| Polymer Designation | F | G | H | I | J |
| TA | 50 | — | 40.0 | 37.5 | 37.5 |
| IA | — | 50.0 | — | 37.5 | 37.5 |
| TBIA | 50.0 | 50.0 | 60.0 | 15.0 | 25.0 |
| Bisphenol-A | 100.0 | 100.0 | 100.0 | 50.0 | 75.0 |
| Bisphenol-S | — | — | — | 50.0 | — |
| TBHQ | — | — | — | — | 25.0 |
| RV (dl/g) | 1.03 | 0.97 | 1.01 | 1.20 | 0.91 |
| Tg° C. | 212 | 186 | 210 | 213 | 207 |

TA = terephthalic acid;
IA = isophthalic acid;
TBIA = 5-tert.-butylisophthalic acid;
Bisphenol-A = 2,2-bis(4-hydroxyphenyl)propane;
Bisphenol-S = 4,4-bis(hydroxyphenyl)sulfone;
TBHQ = t-butylhydroquinone

EXAMPLE 1

This example serves to demonstrate the unique miscibility between the t-butyl containing polyarylates and a polyamide sold under the trade name of Trogamid T ® by the Dynamit-Nobel Co. Trogamid T ® has the formula (26) shown:

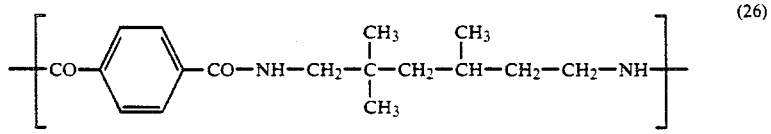

(26)

The ratio of the number of aliphatic carbon atoms to the number of aromatic carbon atoms for the groups $R_1$ and $R_2$ (see formula(4)) is $9/6 = 1.5$.

Blends of Trogamid T ® and polyarylates (Table I, polymers A-J) were prepared in a Brabender mixing apparatus at 63 rpm for 5 minutes under a nitrogen blanket and at a temperature of 290° C. Samples of the polymer melt were taken and the Tg's were measured by differential scanning calorimetry (DSC, 10° C./min heating rate). Physical properties were measured on compression-molded specimens. The data in Table II represents blends of polymers A-J with Trogamid T ® at a 50/50 w/w ratio. The data in Table III shows the physical properties of select blends from Table II.

TABLE II

Miscibility of Blends of Polyarylates with Polyamide

| Polyarylates | Composition of Blend (w/w) | | | | | | | | | |
|---|---|---|---|---|---|---|---|---|---|---|
| A | 50 | — | — | — | — | — | — | — | — | — |
| B | — | 50 | — | — | — | — | — | — | — | — |
| C | — | — | 50 | — | — | — | — | — | — | — |
| D | — | — | — | 50 | — | — | — | — | — | — |
| E | — | — | — | — | 50 | — | — | — | — | — |
| F | — | — | — | — | — | 50 | — | — | — | — |
| G | — | — | — | — | — | — | 50 | — | — | — |
| H | — | — | — | — | — | — | — | 50 | — | — |
| I | — | — | — | — | — | — | — | — | 50 | — |
| J | — | — | — | — | — | — | — | — | — | 50 |
| Trogamid T ® | 50 | 50 | 50 | 50 | 50 | 50 | 50 | 50 | 50 | 50 |
| Blend Tg (°C., DSC) | 147, 190 | 147, 191 | 167 | 167 | 169 | 177 | 165 | 147, 210 | 179 | 175 |
| Transparent[2] | N | N | Y | Y | Y | Y | Y | N | Y | Y |
| Miscibility[3] | I | I | M | M | M | M | M | I | M | M |

[1]Trogamid T ®: Tg = 147° C. via DSC
[2]Y = transparent, N = opaque
[3]M = miscible (represented by a single Tg intermediate between polyarylate and Trogamid T ® respective Tgs); I = immiscible (two Tgs representative of two components)

TABLE III

Properties of Selected Polyarylate/Polyamide Blends

| Polyarylate (Table I) | Material Tested | | | | |
|---|---|---|---|---|---|
| A | 100 | 50 | — | — | — |
| D | — | — | — | 100 | 50 |
| Polyamide* | — | 50 | 100 | — | 50 |
| Tg (via resilience measurement), °C. | 194 | 145 193 | 145 | 195 | 168 |
| Tensile Mod. (psi) | 224,000 | 221,000 | 284,000 | 216,000 | 228,000 |
| Tensile Str. (psi) | 10,100 | 7,100 | 10,600 | 10,100 | 9,500 |
| Elongation at Break (%) | 16.8 | 9.1 | 46 | 16 | 21 |
| Pendulum Impact (ft-lbs/in³) | 152 | 87 | 106 | 107 | 186 |
| H₂O Absorption (%) | 0.53 | 0.98 | 3 | 0.51 | 0.92 |

*Trogamid T

EXAMPLE 2

The polyamides of this example were prepared according to the techniques described in Interfacial Synthesis, Vol. II, p. 157, Marcel Decker, Inc. and U.S. Pat. Nos. 4,603,166 and 4,603,193. The polyamides are characterized in Table IV.

The polyamides are melt-blended with polyarylate E (of Table I) using the Brabender mixing apparatus (285° C., 63 rpm, 5 min.). Samples of the melt mixed polymers were analyzed for Tg by DSC and the obtained values are listed in Table V. From the data in Table V it is clear that polyamides, in which the ratio indicated below (for groups $R_1$ and $R_2$ of formula (4)) is in the range of 1.4 to 2.5, are miscible with the polyarylate containing the t-butyl substituted isophthalic acid moieties.

$$1.4 \leq \frac{\text{Total aliphatic carbon atoms}}{\text{Total number of aromatic carbons}} \leq 2.5$$

TABLE IV

| Composition(1) | Polyamides Designation | RV (dl/g) (1) | Tg/Tm (°C.) (3) | Ratio of aliph./ aromatic carbon atoms |
|---|---|---|---|---|
| 2,6-NDA/TMHMDA | K | 2.11 | 162/— | 0.90 |
| PIDA/TMHMDA | L | 1.53 | 166/— | 1.25 |
| T/I/AA/HMDA (60/22/18/100) | M | 1.14 | 107/294 | 1.36 |
| AA//MXD/HMDA (100/80/20) | N | 1.62 | 74/— | 1.41 |
| TA/TMHMDA | O | 2.01 | 151/— | 1.50 |
| TBIA/HMDA | P | 1.72 | 136/— | 1.66 |
| TA/IA/AA/HMDA (50/20/30/100) | Q | 1.57 | 98/291 | 1.76 |
| TBIA/TMHMDA | R | 1.82 | 162/— | 2.16 |
| TBIA/1,12 DADD | S | 2.13 | 62/— | 2.66 |

(1) 2,6-NDA = naphthalene-2,6-dicarboxylic acid;
TMHMDA = 2,2,4-trimethylhexamethylene diamine;
PIDA = an indone dicarboxylic acid of formula (27)

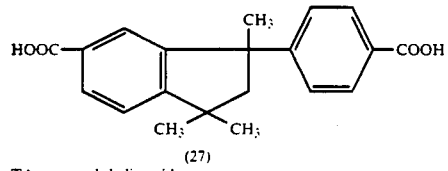

(27)

TA = terephthalic acid;
IA = isophthalic acid;
AA = adipic acid;
HMDA = hexamethylene diamine;
MXD = meta-xylenediamine;
TBIA = 5-tert.-butyl isophthalic acid;
DADD = diaminododecane.
(2) RV's measured in phenol/tetrachloroethane (60/40 by wt.); at 25° C. (0.5 g/100 mm).
(3) Melting points (Tm) measured.

TABLE V

| 50/50 Wt. Blends of Polyamides with Polyarylate E 50 parts by wt. polyarylate E, with 50 parts by wt. of the polyamides of Table IV | | | | | | | | | |
|---|---|---|---|---|---|---|---|---|---|
| | 50 K | 50 L | 50 M | 50 N | 50 O | 50 P | 50 Q | 50 R | 50 S |
| Blend Tg (°C., DSC) | 162 198 | 166 198 | 107 197 | 133 | 174 | 166 | 147 | 178 | 63 148 |
| Transparent | No | No | No | Yes | Yes | Yes | Yes | Yes | No |
| Miscibility(1) | I | I | I | M | M | M | M | M | I |

(1) I = immiscible; M = miscible

We claim:

1. A thermoplastic miscible polymer blend composition having a single glass transition temperature, comprising:
   (1) an aliphatic-aromatic polyamide wherein the ratio of the total number of aliphatic carbons to the total number of aromatic carbons is in the range of about 1.5 to 2.5; and
   (2) a polyarylate comprising repeating units derived from (i) a dihydric aromatic moiety; (ii) an aromatic dicarboxylic acid moiety; and (iii) at least one tertiary butyl substituted moiety selected from the group consisting of tertiary butyl substituted aromatic dicarboxylic acid moieties and tertiary butyl substituted dihydric aromatic moieties, wherein said tertiary butyl substituted moiety constitutes from about 12 mole % to about 50 mole % of the total polyarylate moieties.

2. A thermoplastic miscible polymer blend composition having a single glass transition temperature, comprising:
   (1) an aliphatic-aromatic polyamide wherein the ratio of the total number of aliphatic carbons to the total number of aromatic carbons is about 1.4; and
   (2) a polyarylate comprising repeating units derived from (i) a dihydric aromatic moiety; (ii) an aromatic dicarboxylic acid moiety; and (iii) at least one tertiary butyl substituted moiety selected from the group consisting of tertiary butyl substituted aromatic dicarboxylic acid moieties and tertiary butyl substituted dihydric aromatic moieties, wherein said tertiary butyl substituted moiety constitutes about 25 mole % of the total polyarylate moieties.

3. The thermoplastic miscible blend composition as in claim 1 or 2 wherein said polyarylate repeating units derived from dihydric aromatic moieties comprise units derived from dihydric phenol; and said repeating units derived from tertiary butyl substituted moieties comprise units derived from tertiary butyl substituted isophthalic acid.

4. The thermoplastic miscible blend composition of claim 3 wherein said dihydric phenol comprises 2,2-bis(4-hydroxyphenyl) propane.

5. The thermoplastic miscible blend composition as in claim 1 or 2 wherein said aliphatic-aromatic polyamide comprises repeating amide units derived from dicarboxylic acid and diamine.

6. The thermoplastic miscible blend composition as in claim 1 or 2 wherein said aliphatic aromatic polyamide comprises repeating amide units derived from isophthalic acid and an aliphatic diamine comprising at least six carbon atoms.

7. The thermoplastic miscible blend composition of claim 6 wherein said diamine comprises hexamethylene diamine.

* * * * *